(12) United States Patent
Hattori

(10) Patent No.: US 6,593,801 B1
(45) Date of Patent: Jul. 15, 2003

(54) POWER DOWN MODE SIGNALED BY DIFFERENTIAL TRANSMITTER'S HIGH-Z STATE DETECTED BY RECEIVER SENSING SAME VOLTAGE ON DIFFERENTIAL LINES

(75) Inventor: Hide Hattori, Palo Alto, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 0 days.

(21) Appl. No.: 10/064,074

(22) Filed: Jun. 7, 2002

(51) Int. Cl.[7] ................................................. G05F 1/10
(52) U.S. Cl. .......................... 327/544; 327/65; 327/76; 326/14
(58) Field of Search ................................. 327/544, 545, 327/546, 65, 68, 70, 76, 89, 90; 326/14; 330/133

(56) References Cited

U.S. PATENT DOCUMENTS

| | | | | |
|---|---|---|---|---|
| 3,870,952 A | * | 3/1975 | Sibley | 324/393 |
| 4,635,257 A | | 1/1987 | Shinohara | 371/12 |
| 4,726,024 A | | 2/1988 | Guziak | 371/16 |
| 5,142,474 A | | 8/1992 | Miyata et al. | 364/424.03 |
| 5,467,369 A | | 11/1995 | Vijeh et al. | 375/224 |
| 5,577,001 A | | 11/1996 | Sandhu | 365/207 |
| 5,721,594 A | | 2/1998 | Gurley et al. | 348/707 |
| 6,188,271 B1 | | 2/2001 | Wang et al. | 327/545 |
| 6,256,234 B1 | | 7/2001 | Keeth et al. | 365/189.05 |
| 6,275,963 B1 | | 8/2001 | Maeno et al. | 714/26 |
| 6,288,577 B1 | * | 9/2001 | Wong | 327/65 |
| 6,295,245 B1 | | 9/2001 | Tomita et al. | 365/230.08 |
| 6,307,891 B1 | | 10/2001 | Hein et al. | 375/285 |
| 6,320,406 B1 | | 11/2001 | Morgan et al. | 326/14 |
| 6,339,344 B1 | | 1/2002 | Sakata et al. | 326/83 |
| 6,357,018 B1 | | 3/2002 | Stuewe et al. | 714/37 |

OTHER PUBLICATIONS

Tan, Hock, Letter to JEDEC Members from ICS, 2 pages with timing diagram Mar. 4, 2002.

* cited by examiner

*Primary Examiner*—Timothy P. Callahan
*Assistant Examiner*—An T. Luu
(74) *Attorney, Agent, or Firm*—Stuart T. Auvinen

(57) ABSTRACT

A power-down signal is encoded into a differential pair of lines between two chips. When the differential transmitter powers down, it enters a high-impedance state and floats the differential lines A shunt resistor between a pair of differential lines equalize the voltages on the differential lines so they float to a same voltage when a differential transmitter is disabled and enters a high-impedance state. The condition of equal voltages on the differential lines is detected by an equal-voltage detector that generates a power-down signal when the differential lines are at equal voltages for a period of time. The period of time can be greater than the cross-over time during normal switching to prevent false power-downs during normal switching. Standard differential drivers can signal power-down using the high-impedance state, which is detected by equal voltages on the differential lines. A sensitive dual-differential amplifier and a simpler detector are disclosed.

16 Claims, 6 Drawing Sheets

POWER DOWN MODE SIGNALED BY DIFFERENTIAL TRANSMITTER'S HIGH-Z STATE DETECTED BY RECEIVER SENSING SAME VOLTAGE ON DIFFERENTIAL LINES

BACKGROUND OF INVENTION

This invention relates to integrated circuits with differential signals, and more particularly to a power-down signal encoded in a differential signal.

One technique for increasing the signaling speed of integrated circuits (IC's) is to use differential rather than single signals. A differential pair of signals has two physical lines that move in opposite directions when changing state: one differential signal line is driven to a higher voltage while the other differential line is driven to a lower voltage. At steady-state, one of the differential signal lines is in a high state while the other differential line is in a low state. The difference in voltage between the high and low states can be only a few hundred milli-volts, minimizing voltage swing, capacitive charging delays, and overall signal propagation delay.

Many modern electronic systems are portable, running on limited battery power. Other systems must limit power consumption to reduce cooling requirements or electric power costs. Often some parts of a system are not in continuous use and can be powered down when idle.

FIG. 1 highlights power-down of differential signaling between two chips. Transmitter chip 14 contains differential transmitter 10, which drives differential output lines V+, V− to opposite states. Differential receiver 12 in receiver chip 16 senses a small voltage difference between differential input lines V+, V− and outputs a single signal to logic inside receiver chip 16. This signal can be a clock signal generated by transmitter chip 14.

Transmitter chip 14 may contain control logic that determines when the functions performed by receiver chip 16 are no longer needed. Transmitter chip 14 activates power-down signal PWR-DN which connects to an enable input of receiver chip 16. Activating PWR-DN causes receiver chip 16 to enter a low-power state.

Sometimes the connection between chips 14, 16 can be broken, such as when a cable is unplugged. FIG. 2 shows a fail-safe circuit that blocks data in a receiver when a differential connection is broken. The differential lines driven by differential driver 10 in transmitter chip 14 are disconnected from receiver 12, perhaps by a disconnected cable. Pull-up resistors 24, 26 near receiver chip 16' pull the differential inputs high when the cable is disconnected. NAND gate 22 detects when both of the differential inputs are in the high state, which does not occur during normal operation.

NAND gate 22 drives the fail-safe signal FSB low when the H—H condition is detected, causing AND gate 20 to output a low, regardless of the data condition sensed by receiver 12. Thus downstream logic in chip 16' is protected from indeterminate data and metastability by the fail-safe circuit.

Oftentimes the number of available pins on an integrated circuit chip is limited. Pin functions can be combined to save pins, such as by using an encoded clock using Manchester Encoding, or by using illegal conditions estates of one or more pins) to signal a seldom-used mode.

FIG. 3 shows a power-down mode encoded by an illegal high-high state of differential lines. Transmitter chip 14' generates an internal power-down signal PDN when control logic determines that receiver chip 16 should power down. This PDN signal causes modified differential transmitter 10' to ignore its data input and instead drive both differential outputs to a high state. Normally one or the other differential line is driven low, so the high-high condition is abnormal or illegal.

NAND gate 22 in receiver chip 16" detects when both differential lines are in the high state, and activates the internal power-down signal PDNB by driving it low. This internal power-down signal then powers down logic in receiver chip 16". This may include logic downstream of receiver 12, so that an indeterminate state of the output from receiver 12 does not propagate.

Rather than signaling the power-down condition using the high-high state, the low-low state can be used. However, logic in receiver chip 16" must be modified to detect this low-low condition rather than the high-high condition. A disadvantage of this technique is that transmitter 10 in transmitter chip 14 must be modified to generate the high-high or low-low condition. Both chips 14, 16 must be modified and designed to operate with one another. A standard differential transmitter cannot be used, since a standard differential transmitter does not generate the illegal H—H or L—L state.

Such a modification of the differential transmitter may not always be possible, such as when the differential transmitter is on a personal computer (PC) driving a clock to a memory module. While the differential receiver on the memory module could be modified as new versions of memory modules are designed, the differential transmitter cannot be modified for pre-installed computers.

FIG. 4A shows a standard differential transmitter with an enable. Standard transmitter chip 28 includes differential transmitter 30 that drives a pair of differential lines to receiver chip 16". NAND gate 22 can detect the high-high condition and activate a power-down mode in receiver chip 16". However, differential transmitter 30 cannot drive both differential lines high.

When the enable input to differential transmitter 30 is de-activated, differential transmitter 30 stops driving both differential lines and enters a high-impedance (high-Z) state. This high-Z state is not the same as a high state.

FIG. 4B is a waveform of a standard differential transmitter entering the high-Z state. When enable ENA is high, differential transmitter 30 drives differential lines V+, V− to opposite states as the data input to differential transmitter 30 toggles. When ENA goes low, differential transmitter 30 is disabled and stops driving the differential lines. The differential lines then float.

If the differential lines were completely isolated, the voltage would remain in the prior state. However, capacitive coupling from other signals and leakage can upset the voltages on the differential lines, causing them to drift. Leakage between the two differential lines can cause the voltages to equalize over time. Any terminating resistors can also alter the voltages on the differential lines.

Since NAND gate 22 in receiver chip 16" only detects dual high voltages, the floating differential lines do not necessarily trigger the power-down state. Indeed, as other signals capacitivly couple into the differential lines, receiver chip 16" can pass in and out of the power-down state, causing logical problems. Thus the high-impedance state is not as useful as the dual-high state for signaling power-down, causing a non-standard differential drive to be needed.

What is desired is a differential receiver that can detect a power-down condition on a differential pair of lines. It is desirable to use standard differential transmitters to signal a power-down condition to a modified differential receiver.

DETAILED DESCRIPTION

The present invention relates to an improvement in power-down of differential receivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that a standard differential transmitter can enter a high-impedance state that floats the differential lines. This high-impedance state is often entered when the system powers down, such as when the differential transmitter is in a personal computer that powers-down its memory subsystem. The PC disables its differential drives to memory modules when powering down. Thus existing PC's often power-down by Z-stating their differential drivers.

The high-impedance state of differential lines can thus be used as a power-down signal to a memory module. A detector on the memory module can be added that detects the high-impedance states of the differential lines from the PC, and drive a power-down signal to enable inputs of memory chips. Of course, this is but one of many applications.

When a shunt resistor is added between the differential lines, the differential lines float to a same voltage when the differential transmitter enters the high-impedance state. The final voltage of the differential lines can be high, low, or intermediate, and can change with time due to capacitive coupling and leakage. However, the voltages of the two differential lines should be mostly the same due to the shunt resistor.

The condition of equal voltages on the differential lines can be detected by an equal-voltage detector that generates a power-down signal when the differential lines are at equal voltages for a period of time. The power-down signal can be activated when both differential lines are at equal voltages for a relatively long period of time. Thus the inventor realizes that standard differential drivers can signal power-down using the high-impedance state, which is detected by equal voltages on the differential lines.

Figure 1:
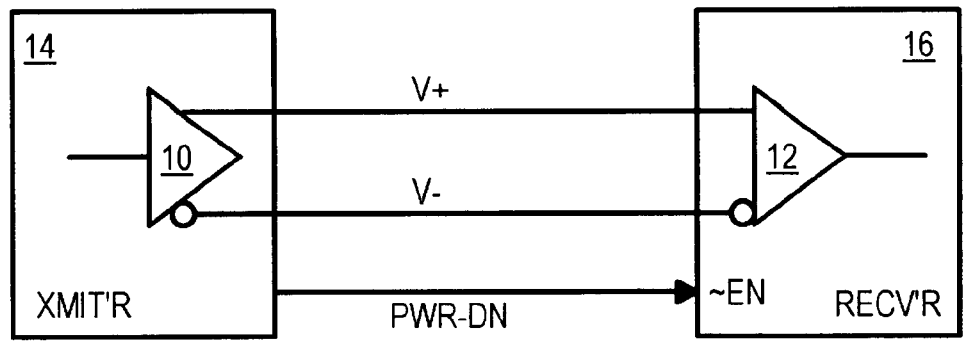
FIG. 1 highlights power-down of differential signaling between two chips.
Figure 2:
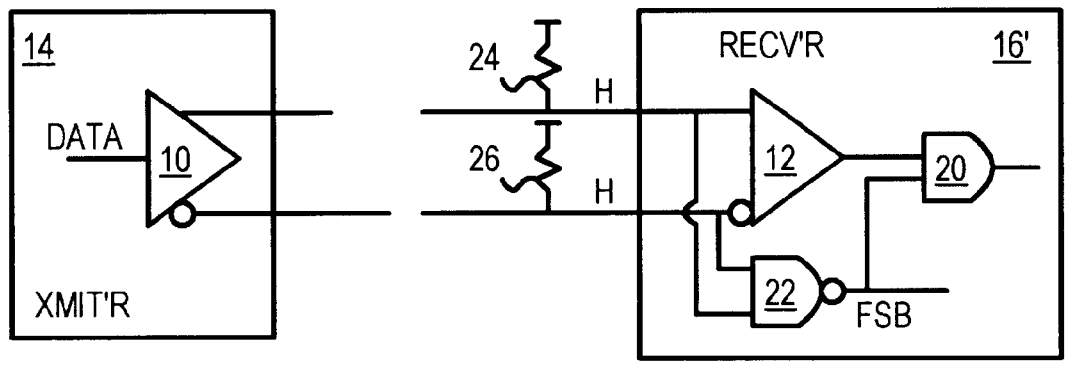
FIG. 2 shows a fail-safe circuit that blocks data in a receiver when a differential connection is broken.
Figure 3:
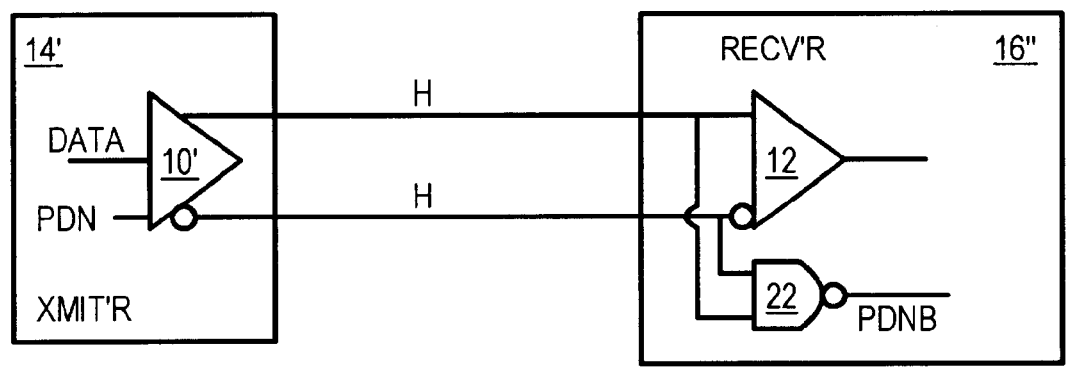
FIG. 3 shows a power-down mode encoded by an illegal high-high state of differential lines.
Figure 4A:
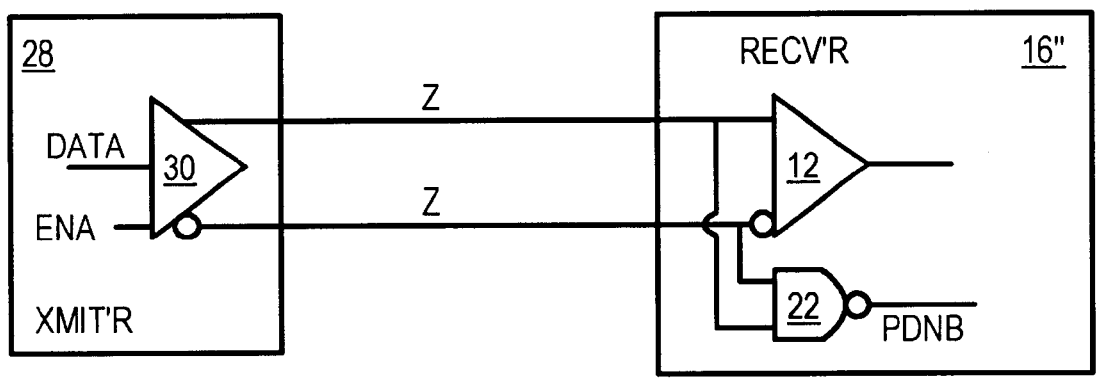
FIG. 4A shows a standard differential transmitter with an enable.
Figure 4B:
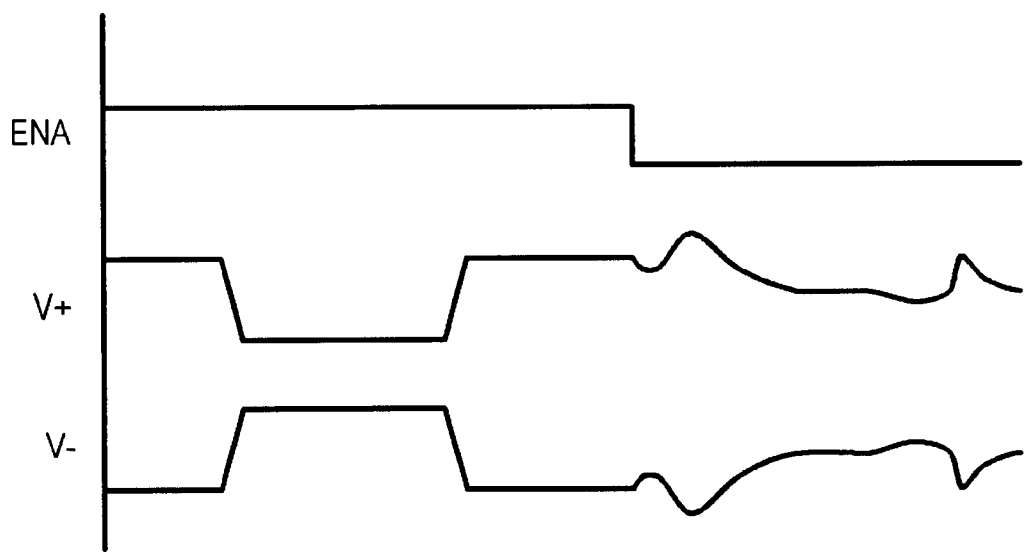
FIG. 4B is a waveform of a standard differential transmitter entering the high-Z state.
Figure 5A:
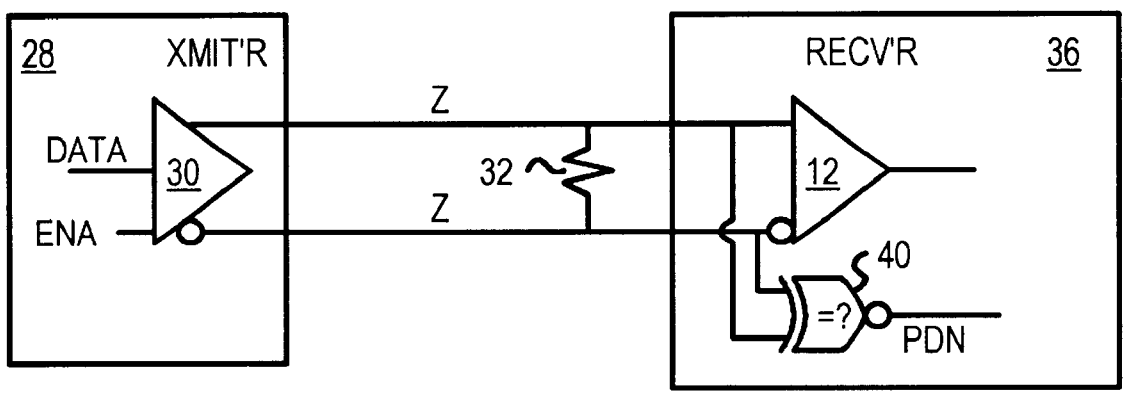
FIG. 5A shows detection of a high-impedance state of a standard differential transmitter to signal a power-down condition in the receiver.

FIG. 5A shows detection of a high-impedance state of a standard differential transmitter to signal a power-down condition in the receiver. Standard transmitter chip 28 includes differential driver or transmitter 30 that drives a clock or data onto a differential pair of lines between chips 28, 36. One differential line is driven with true clock or data and the other differential line with the inverse or complement of the clock or data. When the enable signal ENA is driven low, differential transmitter 30 is disabled and no longer drives the differential lines. A high-impedance state (Z) is entered on both differential lines.

Differential receiver 12 in receiver chip 36 receives the pair of differential lines and senses a voltage difference. The voltage difference can be amplified and used to drive a data or clock signal in receiver chip 36.

Shunt resistor 32 can be a 120-Ohm or other value resistor between the pair of differential lines. The resistance value is sufficiently large to allow differential transmitter 30 to drive the differential lines sufficiently high and low so that differential receiver 12 can sense a voltage difference. A weak differential driver may require a larger resistance value such as 1K-Ohm or more.

When differential transmitter 30 is disabled, the differential lines float. One differential line may be at the high voltage while the other is at the low voltage when differential transmitter 39 is first disabled, but shunt resistor 32 eventually equalizes the voltages so that both differential lines have the same voltage. Equal-voltage detector 40 then detects the equal voltages on both differential lines and activates power-down signal PDN. Signal PDN can then power-down circuits in receiver chip 36.

Figure 5B:
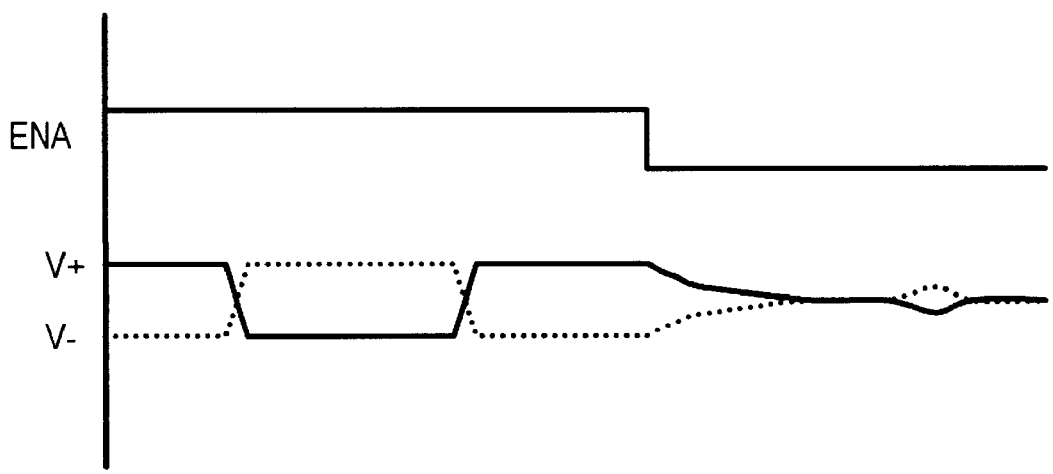
FIG. 5B is a waveform showing detection of equal voltages on differential lines.

FIG. 5B is a waveform showing detection of equal voltages on differential lines.

When enable ENA is active, the differential transmitter drives differential lines V+, V− to opposite states to signal clock or data changes. When enable ENA goes low, the differential driver is disabled and enters a high-impedance state. The differential lines float. The shunt resistor between the differential lines causes the voltages to be equalized over time. Any disturbance to one line may cause a temporary voltage difference that is later re-equalized through the shunt resistor. Equal-voltage detector 40 detects when the differential lines V+, V− are at the same voltage and drives the power-down signal PDN high to activate the power-down state.

Figure 6:
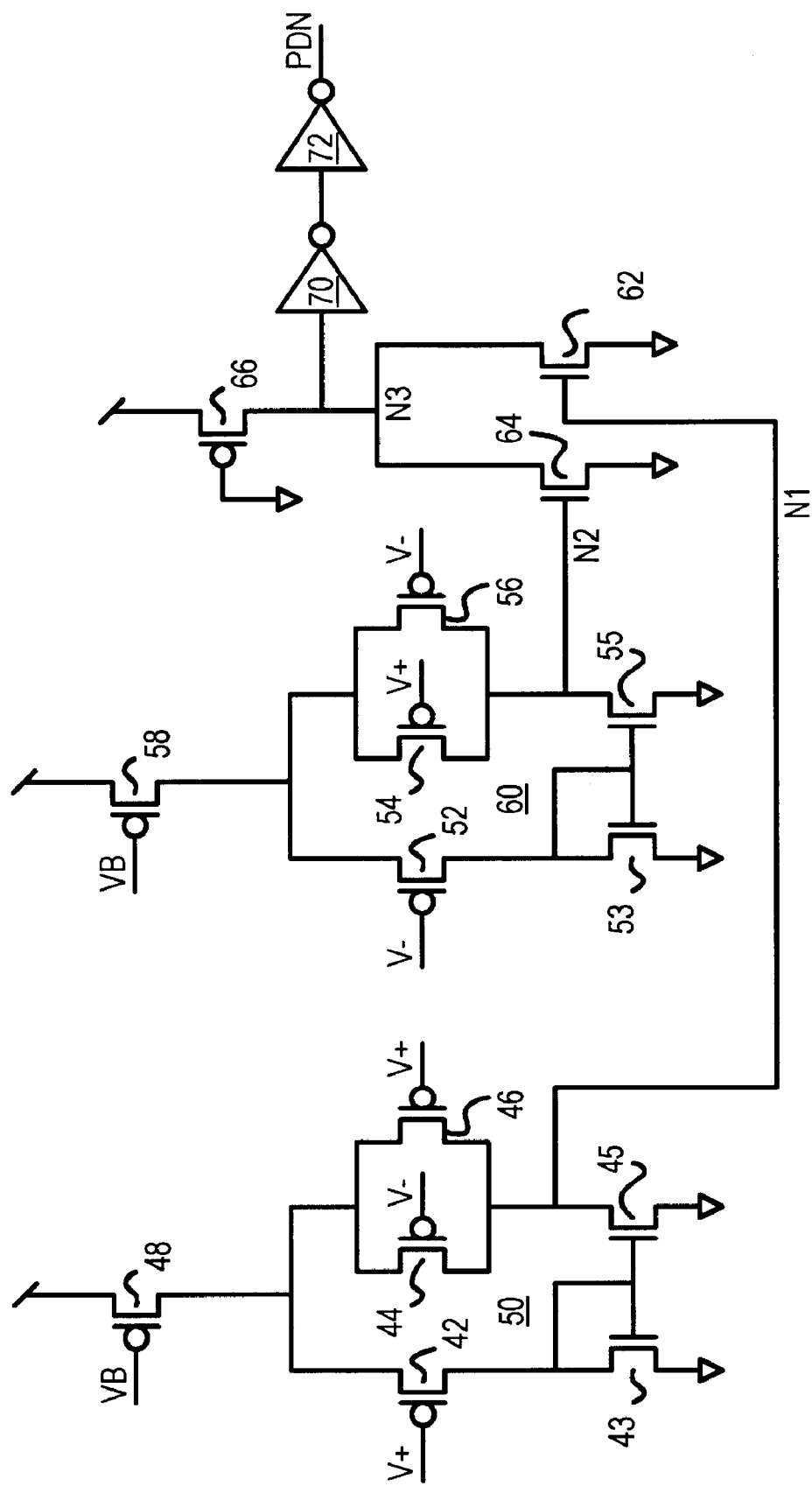
FIG. 6 is a schematic of a more sensitive embodiment of the equal-voltage detector that signals the power-down condition.

FIG. 6 is a schematic of a more sensitive embodiment of the equal-voltage detector that signals the power-down condition. In this embodiment, equal-voltage detector 40 can operate at a power-supply voltage (Vcc or Vdd) of 1.8 volts due to the sensitivity and wide operating range of the differential amplifiers used.

True differential amplifier 50 has a current supplied by p-channel current-source transistor 48 which has its gate biased by bias voltage VB. Bias voltage VB can be generated by a voltage divider or other voltage generating circuit, and can be a little more than a transistor threshold below Vcc.

The current from current-source transistor 48 is split into two legs. One leg of current passes through p-channel differential transistor 42, which has a gate driven by differential line V+, while the other leg of current passes through a parallel connection of p-channel differential transistors 44, 46 which have gates driven by both V+, V−. The current from transistors 44, 46 is again combined and passes through n-channel current mirror transistor 45, which has a gate connected to the gate and drain of n-channel current mirror transistor 43, which collects the current from the first leg through differential transistor 42.

True differential amplifier 50 compares the voltage of differential lines V+, V−. When differential transistors 42, 44, 46 all have the same size, and V+ is the same voltage as V−, then twice as much current passes through the second leg (transistors 44, 46 in parallel) as the first leg (transistor 42). However, n-channel mirror transistor 45 is twice as big as mirror transistor 43, so the drains of mirror transistors 43, 45 are at the same voltage when V+ equals V−. This voltage is designed to be below the transistor threshold voltage, so n-channel output transistor 62 remains off. This allows node N3 to be pulled higher by pull-up transistor 66, so power-down signal PDN also goes high (active).

Complement differential amplifier 60 has a current supplied by p-channel current-source transistor 58 which has its gate biased by bias voltage VB. The current from current-source transistor 58 is split into two legs, one leg through p-channel differential transistor 52, which has a gate driven by differential line V−, and the other leg through a parallel connection of p-channel differential transistors 54, 56 which have gates driven by both V+, V−. These two legs of current as sunk through n-channel current mirror transistors 53, 55 which have gates connected together and to the drain of n-channel current mirror transistor 53.

Complement differential amplifier 60 compares the voltage of differential lines V+, V−. When differential transistors 52, 54, 56 all have the same size, and V− is the same voltage as V+, then twice as much current passes through the second leg (transistors 54, 56 in parallel) as the first leg (transistor 52). However, n-channel mirror transistor 55 is twice as big as mirror transistor 53, so the drains of mirror transistors 53, 55 are at the same voltage when V+ equals V−. This voltage is designed to be below the transistor threshold voltage, so n-channel output transistor 64 remains off. With both transistors 62, 64 off, node N3 is eventually pulled high by pull-up transistor 66, so power-down signal PDN also goes high (active).

Thus when V+ equals V−, true differential amplifier 50 drives node N1 low and complement differential amplifier 60 drives node N2 low. Since both N1, N2 are low (below threshold), both the gates of n-channel transistors 62, 64 are off. Inverters 70, 72 buffer node N3 and drive power-down signal PDN high.

When V+ is higher than V−, then in true differential amplifier 50 less current flows through the first leg and transistor 42 due to the smaller gate-to-source voltage drive. The decreased current through mirror transistor 43 lowers its gate voltage, decreasing current through mirror transistor 45 in the second leg. This drives N1 higher, increasing the gate drive and current through n-channel transistor 62, quickly pulling N3 and PDN to ground.

Similarly, when V− is higher than V+, then in complement differential amplifier 60 less current flows through the first leg and transistor 52 due to the smaller gate-to-source voltage drive. The increased current in the second leg drives N2 higher, increasing the gate drive and current through n-channel transistor 64, driving N3 to ground and de-activating power-down signal PDN. Thus when either V+ or V− is higher, node N3 is pulled lower, de-activating the power-down signal.

An inherent delay can be increased by reducing the pull-up current from pull-up transistor 66. The reduced pull-up current slows the rise time of node N3, and hence the turn-on of the power-down signal. Signaling crossovers that are brief do not allow enough time for pull-up transistor 66 to pull node N3 high and signal power-down.

The equal-voltage detector can itself be powered-down by driving bias voltage VB to Vcc. Additional n-channel transistors with gates driven by a power-down signal can drive nodes Ni and N2 to ground.

Figure 7:
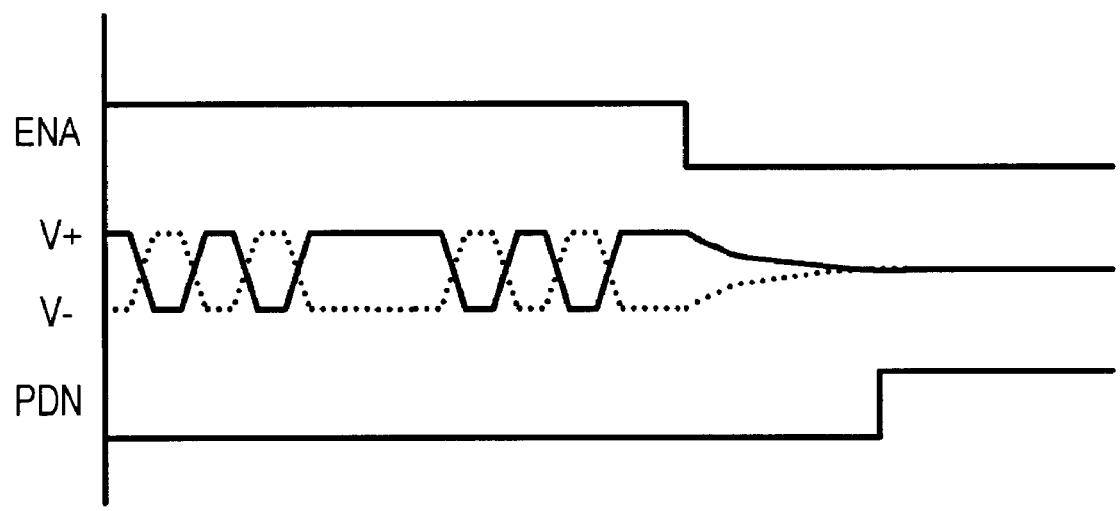
FIG. 7 is a waveform showing power-down detection of equal voltages on differential lines.

FIG. 7 is a waveform showing power-down detection of equal voltages on differential lines. When enable ENA is active, the differential transmitter drives differential lines V+, V− to opposite states to signal clock or data changes. When enable ENA goes low, the differential driver is disabled and enters a high-impedance state. The differential lines float. The shunt resistor between the differential lines causes the voltages to be equalized over time. Any disturbance to one line may cause a temporary voltage difference that is later re-equalized through the shunt resistor. Equal-voltage detector 40 detects when the differential lines V+, V− are at the same voltage and drives the power-down signal PDN high to activate the power-down state.

Although differential lines V+, V− are momentarily at the same voltage during switching as the lines cross-over to their new states, this momentary voltage equality does not trigger the power-down signal. Equal-voltage detector 40 has an inherent delay that filters out switching cross-overs that last much less than the inherent delay. The differential lines must remain at the same voltage for a period of time greater than this inherent delay. In one embodiment the inherent delay is 20 nano-seconds.

Figure 8:
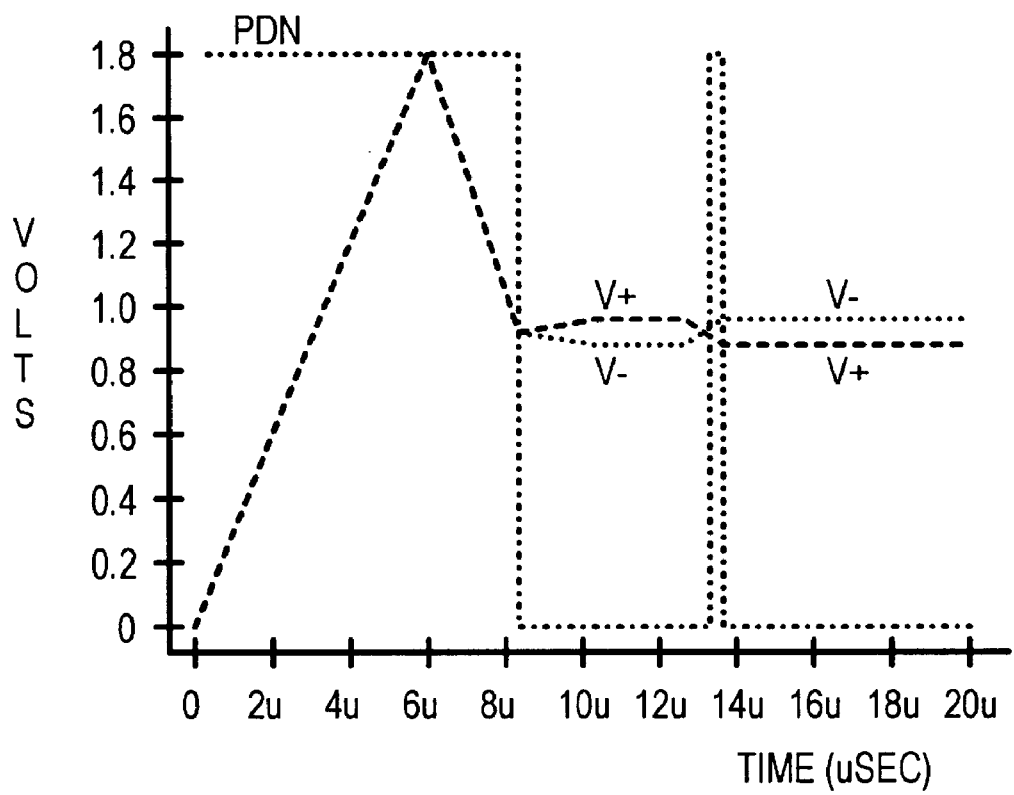
FIG. 8 is a voltage diagram showing operation of the equal-voltage detector.

FIG. 8 is a voltage diagram showing operation of the equal-voltage detector. In the simulation, the differential voltages V+, V− are initially set equal to each other and swept from ground to a Vcc of 1.8 volts, then swept back down to the typical operating voltage of 0.9 volt. The power-down signal PDN output from the equal-voltage detector remains active throughout the voltage sweep showing a wide common-mode range.

When at the typical operating voltage range of 0.8–1.0 volt, the differential voltages are split by about 0.1 volt, causing the power-down signal PDN to become inactive (low). At 13 micro-seconds the differential signals slowly cross-over, causing the power-down signal to be activated briefly as the speed of the cross-over is much slower that the inherent delay of 20 nano-seconds (ns). In actual operation signaling crossovers are much faster than 20 ns and usually much less than 1 ns, so false power-down signaling does not occur.

Figure 9:
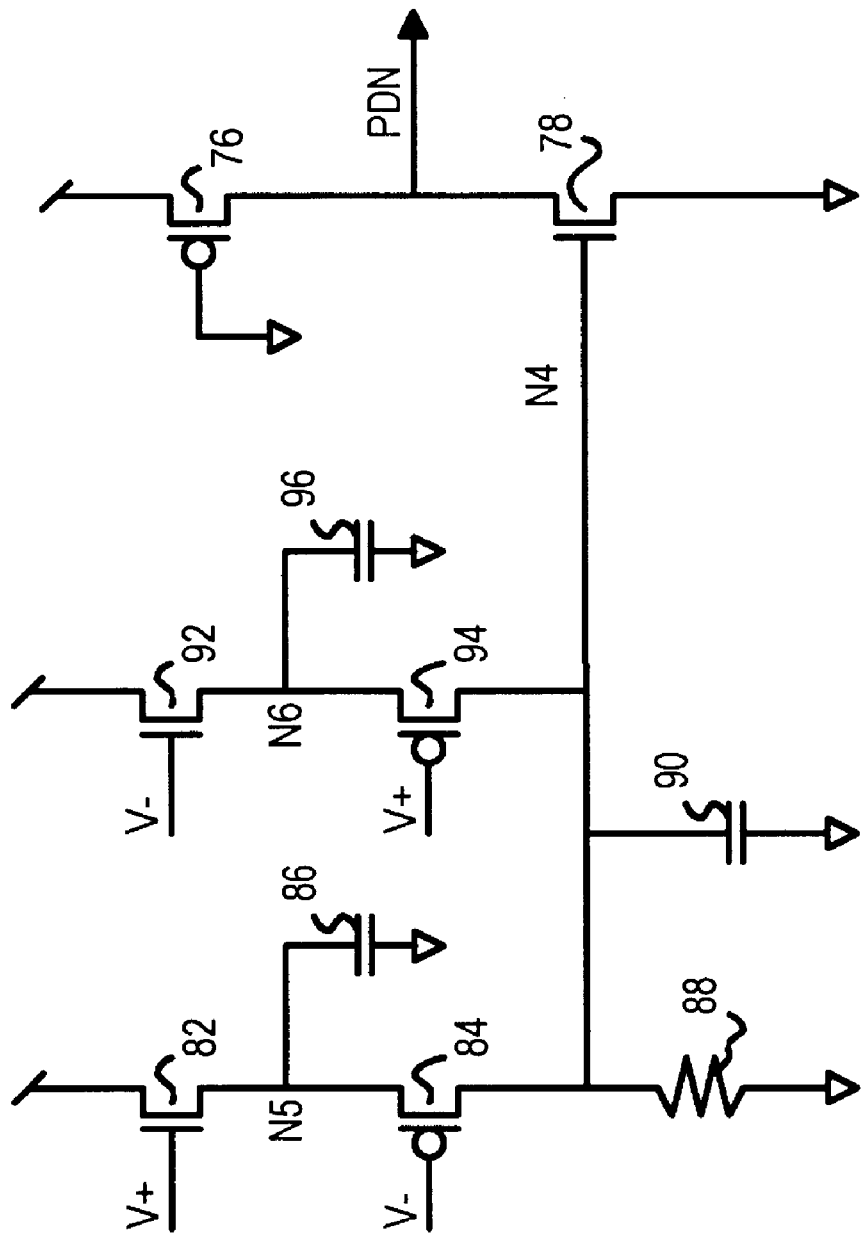
FIG. 9 is an alternative equal-voltage detector for use with larger power-supply voltages that need less sensitivity.

FIG. 9 is an alternative equal-voltage detector for use with larger power-supply voltages that need less sensitivity. Equal-voltage detector 40' can be used with higher Vcc supplies, such as 2.5 volts.

Differential input V+ is applied to the gates of n-channel sensing transistor 82 and p-channel sensing transistor 94, while differential input V− is applied to the gates of p-channel sensing transistor 84 and n-channel sensing transistor 92. Note that the n-channel and p-channel transistors are in a reverse arrangement than normal, since n-channel sensing transistors 82, 92 have drains coupled to power. The source of n-channel sensing transistor 82 connects to the source of p-channel sensing transistor 84 at node N5. Similarly, source of n-channel sensing transistor 92 connects to the source of p-channel sensing transistor 94 at node N6.

The drains of p-channel sensing transistors 84, 94 are tied to node N4, which drives the gate of n-channel output transistor 78, driving power-down output PDN. Pull-up transistor 76 is a p-channel transistor with its gate connected to ground, and has a low current (long channel length) to slowly pull up PDN, filtering out false equal signals when fast cross-overs occur on V+, V− during normal operation.

Capacitors 86, 96 add capacitance to the source nodes N5, N6, respectively, while capacitor 90 adds capacitance to node N4. These capacitances add to the inherent delay to filter out false power-down triggers from normal signaling cross-overs when V+ and V− are momentarily equal.

When V+ is greater than V− by at least the sum of the n-channel and p-channel transistor thresholds, then the gate-to-source voltage of n-channel sensing transistor 82 can be greater than threshold, turning it on. Also, the gate-to-source voltage of p-channel sensing transistor 84 can also exceed threshold, turning it on too. Both sensing transistors 82, 84 turn on, charging capacitors 86, 90 and driving node N4 high. Output transistor 78 turns on, quickly driving PDN low, turning off the power-down signal. Sensing transistors 92, 94 are turned off since the higher V+ is applied to the gate of p-channel sensing transistor 94 while the lower V− is applied to the gate of n-channel sensing transistor 92.

When V− is greater than V+ by at least a the sum of the n-channel and p-channel transistor thresholds then the gate-to-source voltage of n-channel sensing transistor 92 can be greater than threshold, turning it on. Also, the gate-to-source voltage of p-channel sensing transistor 94 can also exceed threshold, turning it on too. Both sensing transistors 92, 94 turn on, charging capacitors 96, 90 and driving node N4 high. Output transistor 78 turns on, quickly driving PDN low, turning off the power-down signal. Sensing transistors 82, 84 are turned off since the higher V− is applied to the gate of p-channel sensing transistor 84 while the lower V+ is applied to the gate of n-channel sensing transistor 82.

When V+ has about the same voltage as V−, the gate-to-source voltages of all four sensing transistors are less than the threshold at steady-state, since the source node is between p-channel and n-channel transistors. Thus sensing transistors 82, 84 and 92, 94 are off, allowing resistor 88 gradually discharged capacitor 90 to ground. Resistor 88 drives node N4 low, turning off transistor 78, and allowing pull-up transistor 76 to drive PDN high to activate the power-down mode after a delay.

When V+ equals V−, and source node N5 is more than a threshold above the gate of p-channel sensing transistor 84, then transistor 84 can turn on, discharging capacitor 86 until the source voltage falls to within a threshold of the gate. Then transistor 84 turns off again. When source node N5 is more than a threshold below the gate of n-channel sensing transistor 82, then transistor 82 can turn on, charging capacitor 86 until the source voltage rises to within a threshold of the gate. Then transistor 82 turns off again. Thus source node N5 is adjusted until both sensing transistors 82, 84 turn off when V+ equals V−. The same behavior occurs for sensing transistors 92, 94 when source node N6 is not at its steady-state voltage.

However, n-channel sensing transistor 82 cannot be on when p-channel sensing transistor 84 is also on, since the gates have the same voltage (V+ equals V−), and the sources have the same voltage (both have source node N5 as their source). Since the n-channel threshold is positive but the p-channel threshold is negative, the gate-tosource voltage cannot be positive and negative at the same time.

ALTERNATE EMBODIMENTS

Several other embodiments are contemplated by the inventor. For example other devices such as additional gates, inverters, buffers, resistors, and capacitors can be added. Many other applications besides memory module power-down are possible, such as for network cards, wireless subsystems, display systems, etc., in PC or other systems.

The power-down signal may be driven off the receiver chip to other chips such as memory chips on a memory module. The equal-voltage detector could be integrated with the differential receiver and the circuits to be powered down, or it could be separate from either or both of the differential receiver and the powered-down circuits. Signals can be active high or active low and can be inverted and logic re-arranged using DeMorgan's theorem. The detection circuits can be flipped over with n-channel and p-channel devices reversed. Other equal-voltage detectors could be substituted, and the ones described can be modified in a variety of ways. Pull-down or pull-up terminating resistors could be added to the differential lines. The pull-up transistors coupled be replaced by resistors, and the pull-down resistor could be replaced by a transistor.

The sizes of the differential transistors in the amplifiers can be varied to adjust activation of the power-down signal by adjusting currents in each amplifier leg. The true and complement amplifiers do not have to have the same sizes when some skew is desired. Capacitors can be implemented as transistors with the drain and source connected together as one capacitor terminal and the gate as the other capacitor terminal.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A differential receiver comprising:
   a true differential input and a complement differential input that together receive a differential signal from a differential transmitter;
   a differential amplifier that receives the true and complement differential inputs and generates an internal signal in a high state when the true differential input is at or above a high differential voltage and the complement differential input is at or below a low differential voltage, but generates the internal signal in a low state when the complement differential input is at or above the high differential voltage and the true differential input is at or below the low differential voltage; and
   equal-voltage detect means, coupled to the true and complement differential inputs, for activating a power-down signal when the true differential input is at a floating voltage and the complement differential input is also at the floating voltage for more than a predetermined period of time;
   wherein the equal-voltage detect means activates the power-down signal when the true and complement differential inputs are both at the floating voltage wherein the floating voltage is any voltage between the high differential voltage and the low differential voltage,
   whereby power-down is signaled by detecting the floating voltage between the high and low differential voltages on both the true and complement differential inputs for more than the predetermined period of time.

2. The differential receiver of claim 1 wherein the floating voltage is any voltage between a power-supply voltage and a ground voltage,
   whereby equal voltages are detected for any voltage between power and ground to signal power-down.

3. The differential receiver of claim 2 wherein the power-down signal powers down blocks in a receiver chip to reduce power consumption by the receiver chip when the true and complement differential inputs are both at the floating voltage when the differential transmitter is in the high-impedance state.

4. The differential receiver of claim 3 wherein the predetermined period of time is at least 20 nanoseconds.

5. The differential receiver of claim 4 further comprising:
   a shunt resistor connected between the true and complement differential inputs, for equalizing voltages on the true and complement differential inputs when the differential transmitter is in a high-impedance state,
   whereby voltages on the true and complement differential inputs are equalized by the shunt resistor.

6. The differential receiver of claim 5 wherein the equal-voltage detect means comprises:
   a first sensing transistor having a gate driven by the true differential input;
   a second sensing transistors having a gate driven by the complement differential input;
   wherein the first and second sensing transistors are in series between a supply node and a sensing node and conduct current between the supply node and the sensing node when the true differential input is at a voltage substantially different from the complement differential input but do not conduct current when the true differential input is at substantially a same voltage as the complement differential input;
   an output transistor, having a gate driven by the sensing node, for de-activating the power-down signal when the true differential input is at a voltage substantially different from the complement differential input.

7. The differential receiver of claim 6 wherein the equal-voltage detect means further comprises:
   a third sensing transistor having a gate driven by the complement differential input;
   a fourth sensing transistors having a gate driven by the true differential input;
   wherein the third and fourth sensing transistors are in series between the supply node and the sensing node and conduct current between the supply node and the sensing node when the true differential input is at a voltage substantially different from the complement differential input but do not conduct current when the true differential input is at substantially a same voltage as the complement differential input,
   wherein the first and second sensing transistors conduct when the true differential input is at a substantially greater voltage than the complement differential input, but the third and fourth sensing transistors conduct when the complement differential input is at a substantially greater voltage than the true differential input.

8. The differential receiver of claim 7 wherein the first and third sensing transistors are n-channel transistors and the second and fourth sensing transistors are p-channel transistors.

9. The differential receiver of claim 8 wherein the equal-voltage detect means further comprises:
   a pull-up transistor for activating the power-down signal when the sensing node turns off the output transistor;
   a pull-down resistor coupled to discharge the sensing node when the true and complement differential inputs are at a same voltage, blocking current through the first, second, third, and fourth sensing transistors.

10. The differential receiver of claim 9 wherein the pull-up transistor activates the power-down signal more slowly than the output transistor de-activates the power-down signal,
    whereby activation of power-down is delayed.

11. The differential receiver of claim 10 wherein the equal-voltage detect means further comprises:
    a first capacitor coupled to the sensing node, to increase a delay of discharging of the sensing node and activating the power-down signal;
    a second capacitor, coupled to a first source node between the first and second sensing transistors;
    a third capacitor, coupled to a second source node between the third and fourth sensing transistors.

12. The differential receiver of claim 5 wherein the equal-voltage detect means comprises:
    first differential amplifier means for sensing a voltage difference between the true differential input and a composite voltage, the composite voltage being a combination of the true and complement differential inputs, the first differential amplifier means outputting a first signal;
    wherein the composite voltage is an intermediate voltage between a true voltage of the true differential input and a complement voltage of the complement differential input;
    second differential amplifier means for sensing a voltage difference between the complement differential input and the composite voltage, the second differential amplifier means outputting a second signal;
    first transistor means, receiving the first signal at a gate, for modulating a first current in response to the first signal;

second transistor means, receiving the second signal at a gate, for modulating a second current in response to the second signal;

combining means, coupled between the first and second transistor means, for combining the first current and the second current to generate a combined sense current;

output buffer means, sensing a voltage produced by the combined sense current, for outputting the power-down signal.

13. The differential receiver of claim 12 wherein the first differential amplifier means comprises:

first current-limiting transistor means for generating a first total current that is divided into a first leg current and a second leg current;

first differential transistor means, coupled to the first current-limiting transistor means, having a gate receiving the true differential input, for modulating the first leg current in response to the true voltage;

first composite differential transistor means, coupled to the first current-limiting transistor means, having a gate receiving the true differential input;

second composite differential transistor means, coupled to the first current-limiting transistor means, having a gate receiving the complement differential input;

wherein the first and second composite differential transistor means are connected in parallel having drains coupled together and sources coupled together, wherein the first and second composite differential transistor means together modulate the second leg current;

first current mirror transistor means, coupled to receive the first leg current;

second current mirror transistor means, coupled to receive the second leg current;

wherein gates of the first and second current mirror transistor means are coupled together.

14. The differential receiver of claim 13 wherein the second differential amplifier means comprises:

second current-limiting transistor means for generating a second total current that is divided into a third leg current and a fourth leg current;

third differential transistor means, coupled to the second current-limiting transistor means, having a gate receiving the complement differential input, for modulating the third leg current in response to the complement voltage;

third composite differential transistor means, coupled to the second current-limiting transistor means, having a gate receiving the true differential input;

fourth composite differential transistor means, coupled to the second current-limiting transistor means, having a gate receiving the complement differential input;

wherein the third and fourth composite differential transistor means are connected in parallel having drains coupled together and sources coupled together, wherein the third and fourth composite differential transistor means together modulate the fourth leg current;

third current mirror transistor means, coupled to receive the third leg current;

fourth current mirror transistor means, coupled to receive the fourth leg current;

wherein gates of the third and fourth current mirror transistor means are coupled together.

15. The differential receiver of claim 14 wherein the first and second differential transistor means and the first, second, third, and fourth composite differential transistor means have a same size and conduct equal currents when the true voltage equals the complement voltage.

16. The differential receiver of claim 15 wherein the first and second differential transistor means and the first, second, third, and fourth composite differential transistor means are p-channel transistors and the first, second, third, and fourth current mirror transistor means are n-channel transistors.

* * * * *